United States Patent
Falkhäll (10) Patent No.: US 10,703,377 B2
(45) Date of Patent: Jul. 7, 2020

(54) METHOD AND DEVICE FOR DETERMINING A MEASURE OF BRAKE SYSTEM USAGE DURING OPERATION OF A VEHICLE

(71) Applicant: Scania CV AB, Södertälje (SE)

(72) Inventor: Johan Falkhäll, Södertälje (SE)

(73) Assignee: Scania CV AB, Södertälje (SE)

(*) Notice: Subject to any disclaimer, the term of this patent is extended or adjusted under 35 U.S.C. 154(b) by 23 days.

(21) Appl. No.: 15/780,162

(22) PCT Filed: Nov. 29, 2016

(86) PCT No.: PCT/SE2016/051181
§ 371 (c)(1),
(2) Date: May 30, 2018

(87) PCT Pub. No.: WO2017/095309
PCT Pub. Date: Jun. 8, 2017

(65) Prior Publication Data
US 2018/0345982 A1    Dec. 6, 2018

(30) Foreign Application Priority Data

Dec. 4, 2015   (SE) ..................................... 1551597

(51) Int. Cl.
*B60W 40/09*     (2012.01)
*B60W 40/076*   (2012.01)
(Continued)

(52) U.S. Cl.
CPC ............... *B60W 40/09* (2013.01); *B60K 6/48* (2013.01); *B60W 10/188* (2013.01);
(Continued)

(58) Field of Classification Search
CPC .... B60W 40/09; B60W 50/14; B60W 40/107; B60W 40/1005; B60W 40/176;
(Continued)

(56) References Cited

U.S. PATENT DOCUMENTS 6,321,144 B1   11/2001   Crombez
2007/0276582 A1   11/2007   Coughlin
(Continued)

FOREIGN PATENT DOCUMENTS

CN   103895631 A   7/2014
FR   2976888 A1   12/2012
(Continued)

OTHER PUBLICATIONS

Scania CV AB, International Application No. PCT/SE2016/051181, International Preliminary Report on Patentability, dated Jun. 5, 2018.
(Continued)

*Primary Examiner* — Anne Marie Antonucci
(74) *Attorney, Agent, or Firm* — Moore & Van Allen PLLC; W. Kevin Ransom (57) ABSTRACT

A method, system and computer program product are provided for determining a measure of brake system usage during operation of a vehicle, the vehicle comprising a power source for generating a motive force for propulsion of the vehicle in a first direction of travel, and driver controllable means for requesting a brake force that acts against a movement of the vehicle in the first direction of travel. When a driver of the vehicle requests a brake force, the method comprises determining an influence on the vehicle acceleration caused by the request for brake force; and determining, based on the determined influence, a measure of brake system usage of the vehicle, the measure indicating a level of economical driving, wherein a particular level is arranged
(Continued)

to depend on the magnitude of the influence on the vehicle acceleration caused by the request for brake force.

12 Claims, 4 Drawing Sheets

(51) Int. Cl.
| | |
|---|---|
| *B60W 30/18* | (2012.01) |
| *B60W 40/10* | (2012.01) |
| *B60W 40/107* | (2012.01) |
| *B60W 50/14* | (2020.01) |
| *B60W 10/188* | (2012.01) |
| *B60W 20/14* | (2016.01) |
| *B60K 6/48* | (2007.10) |

(52) U.S. Cl.
CPC ...... *B60W 20/14* (2016.01); *B60W 30/18109* (2013.01); *B60W 30/18127* (2013.01); *B60W 40/076* (2013.01); *B60W 40/1005* (2013.01); *B60W 40/107* (2013.01); *B60W 50/14* (2013.01); *B60K 2006/4825* (2013.01); *B60K 2370/174* (2019.05); *B60W 2520/105* (2013.01); *B60W 2530/16* (2013.01); *B60W 2540/12* (2013.01); *B60W 2552/15* (2020.02); *B60W 2720/106* (2013.01); *B60Y 2400/81* (2013.01)

(58) Field of Classification Search
CPC ......... B60W 30/18127; B60W 10/188; B60W 20/14; B60W 2720/106; B60W 2530/16; B60W 2550/142; B60W 2540/12; B60W 2520/105; B60W 30/18109; B60W 10/18; B60Y 2400/81; B60K 6/48; B60K 2370/174; B60K 2006/4825
See application file for complete search history.

(56) References Cited

U.S. PATENT DOCUMENTS

| | | |
|---|---|---|
| 2008/0042489 A1 | 2/2008 | Lewis et al. |
| 2010/0211240 A1* | 8/2010 | Crombez .............. B60W 10/08 701/22 |

FOREIGN PATENT DOCUMENTS

| | | |
|---|---|---|
| FR | 3009261 A1 | 2/2015 |
| WO | 0007150 A1 | 2/2000 |
| WO | 2014126529 A1 | 8/2014 |

OTHER PUBLICATIONS

Scania CV AB, European Application No. 16871152.1, Extended European Search Report, dated May 27, 2019.
International Search Report for International Application No. PCT/SE2016/051181 dated Feb. 6, 2017.
Written Opinion of the International Searching Authority for International Application No. PCT/SE2016/051181 dated Feb. 6, 2017.

* cited by examiner

METHOD AND DEVICE FOR DETERMINING A MEASURE OF BRAKE SYSTEM USAGE DURING OPERATION OF A VEHICLE

CROSS-REFERENCE TO RELATED APPLICATION(S)

This application is a National Stage Application (filed under 35 § U.S.C. 371) of PCT/SE2016/051181, filed Nov. 29, 2016 of the same title, which, in turn claims priority to Swedish Application No. 1551597-6 filed Dec. 4, 2015 of the same title; the contents of each of which are hereby incorporated by reference.

FIELD OF THE INVENTION

The present invention relates to a method, system and computer program product for determining a measure of brake system usage during operation of a vehicle, and in particular for determining a measure of applied brake force from a fuel consumption point of view. The invention also relates to a vehicle comprising such a system and/or a computer program product.

BACKGROUND TO THE INVENTION

Vehicles in general, and at least to some extent heavy vehicles in particular, are in focus of ongoing research and development relating to, inter alia, fuel efficiency and reduction of exhaust emissions. Factors such as growing official concern about pollution and air quality, e.g. in urban areas, have led to the adoption of emission standards and rules in many jurisdictions.

In the operation of heavy vehicles such as trucks, buses and the like, over time, vehicle economy has also had an ever increasing impact on the profitability of the business in which they are used. Apart from the procurement cost of a vehicle, the main expense items for routine operation are pay for the driver, repair and maintenance costs and fuel for propulsion. It is therefore important to try as far as possible to reduce costs in each of these areas.

One area in which development is at least partly stimulated by an endeavour to reduce emissions and fuel costs is that of hybrid vehicles. Hybrid vehicles use two or more power sources, and one usual type of such vehicles is the electric hybrid vehicle, in which, e.g. in addition to an internal combustion engine, one or more electrical machines may be used to generate torque/force to act upon the tractive wheels of the vehicle.

Electrical machines afford the advantage of making it possible for electrical energy to be converted to propulsive force with a relatively high degree of efficiency by the electrical machine, which at the same time may also be used to apply a braking force to the vehicle's tractive wheels and use the absorbed kinetic energy to regenerate electrical energy for feeding back to the electrical system of the vehicle and in particular to an energy storage. The regenerated energy may subsequently be reused by the electrical machine to generate propulsive force. Hybrid vehicles thus provide a way of reducing fuel consumption.

However, irrespective of the particular kind of vehicle being used, it is also important that the vehicle is operated in an economical way by their drivers, since the manner a vehicle is operated also may have a large impact on overall fuel economy. This has led to the development of systems intended, for example, to make it easier for drivers and owners to assess whether vehicles are actually being operated in a fuel economizing way.

SUMMARY OF THE INVENTION

In one embodiment, the present invention provides a method for determining brake system usage during operation of vehicles, in particular when a vehicle driver is applying a brake force.

The present invention relates to a method for determining a measure of brake system usage during operation of a vehicle, the vehicle comprising a power source for generating a motive force for propulsion of said vehicle in a first direction of travel, and driver controllable means for requesting a brake force that acts against the movement of said vehicle in said first direction of travel. The method is characterised in, when a driver of said vehicle requests a brake force by means of said driver controllable means:

determining an influence on the vehicle acceleration caused by said request for brake force, and using said determined influence on the vehicle acceleration, determining a measure of brake system usage of said vehicle, said measure being arranged to indicate a level of economical driving, wherein a particular level is arranged to depend on the magnitude of the influence on vehicle acceleration caused by said request for brake force.

As was mentioned above, it is important for overall economy that vehicles are driven in an economical way by drivers, since fuel consumption is greatly affected by driver ability to utilize the energy that is stored in the vehicle when set in motion. It is generally desirable for fuel consumption to be as low as possible, since the larger the amount of energy consumed the more fuel will be required to propel the vehicle by means of the engine.

One way of determining a measure of energy consumption in order to make an assessment of energy use during operation of a vehicle is to determine the amount of fuel consumed over a certain distance. This may, however, result in important factors being disregarded, and which may considerably affect the vehicle's fuel consumption. For example, it may be difficult to identify how much fuel consumption is due to incautious driving and how much is due to other factors that may be difficult for the driver to influence, e.g. level versus hilly terrain, heavily loaded vehicle and/or arterial road versus urban environment with dense traffic.

During operation of a vehicle it may also be difficult for the driver to know how well the energy, e.g. the potential and kinetic energy, that accumulates in the vehicle when the vehicle is in motion is actually utilized, i.e. whether the driver is operating the vehicle in an economical manner.

The present invention makes it possible to assess how a driver operates the vehicle for at least some situations and in a way which largely eliminates any effect of cargo or surroundings upon the assessment. This is achieved by determining the impact on the propulsion of the vehicle when the driver applies vehicle brakes.

According to the invention, a measure of brake system usage is estimated when the vehicle driver actively applies a brake force by means of a brake system.

In particular, this is determined by determining an influence on the vehicle acceleration caused by the request for brake force, and using the determined influence on the vehicle acceleration, a measure of energy consumption during operation of said vehicle is determined. That is, the influence on vehicle acceleration is determined, and a measure is determined on the basis of the influence. For example, the influence can consist of the difference in acceleration that the applied brake force gives rise to in relation to a situation where the brake force had not been applied. The measure can be arranged to indicate a level of economical driving, where there may be various levels and wherein the particular level being indicated may be arranged to depend on the magnitude of the influence on vehicle acceleration caused by said request for brake force.

A magnitude of the difference in acceleration that the applied brake force gives rise to can be determined, and the measure can be determined on the basis of this magnitude. This has the advantage that e.g. a more favourable measure, from an economical, fuel consumption, point of view, can be obtained, for lower influences on vehicle acceleration in comparison to higher influences. The measure can indicate various levels of economical driving, wherein a particular level can be arranged to depend on the magnitude of the influence on the vehicle acceleration caused by said request for brake force.

According to one embodiment, the magnitude of the difference in acceleration that said applied brake force gives rise to can be compared with an acceleration threshold, and it can be determined that driving is more economical when said magnitude of the difference in acceleration is below the acceleration threshold than when said magnitude of the difference in acceleration exceeds said acceleration threshold. A difference in acceleration that said applied brake force gives rise to being below said acceleration threshold can be considered as an economical way of driving said vehicle, while a higher difference in acceleration can be considered as excessive use of vehicle brakes that should be avoided.

The acceleration threshold can be arranged to differ in dependence of the inclination on the surface on which said vehicle is travelling. For example, the acceleration threshold can be higher when the vehicle is going downhill than when going uphill. The inclination in itself will decelerate the vehicle when going uphill, and accelerate the vehicle when going downhill, and the use of differing thresholds has the advantage that the thresholds can be adapted to allow a suitable overall vehicle acceleration for each driving situation.

For example, according to one embodiment the acceleration threshold is such that, when the vehicle is going downhill, a difference in acceleration caused by the applied brake force and which results in the vehicle decelerating at most by a first acceleration represents an economical manner of driving the vehicle.

Instead of comparing the difference in acceleration caused by the applied brake force with a threshold, the resulting vehicle acceleration can instead be compared with an acceleration threshold. That is, the resulting overall vehicle acceleration is used to represent influence on the vehicle acceleration caused by said request for brake force, and form basis of the measure. This has similar advantages to the above. Driving can be considered more economical when the magnitude of the vehicle acceleration is below the acceleration threshold than when the magnitude of the vehicle acceleration exceeds the acceleration threshold.

The measure of brake system usage can be presented to the driver of the vehicle to give feedback on driving behaviour. The measure can be presented e.g. via a display, and for example in the form of a message indicating measures that can be taken to improve brake system usage, i.e. apply less brake force over time, if the acceleration threshold is exceeded.

According to embodiments of the invention, an indication of a quantification of the measure can be displayed to differ between different levels of more or less economical driving.

The measure of brake system usage may further be combined with other measures for assessing the driver's ability to conserve energy stored in the vehicle. For example, the measure of brake system usage can be combined with a measure of energy utilization when the vehicle is being driven without requesting either a brake force or a propelling force.

The method may comprise determining said measure of brake system usage for one situation at a time where a brake force is applied, enabling the driver to have an assessment for a specific situation in which a brake force is applied and hence to obtain and be presented with a new assessment each time a brake force is applied. The measure of brake system usage may also be determined continuously when the driver actively requests a brake force in which case the measure/assessment may change instantaneously depending on changes in applied brake force and/or acceleration.

Further characteristics of the present invention and advantages thereof are indicated by the detailed description set out below of embodiment examples and the attached drawings.

DETAILED DESCRIPTION OF THE INVENTION

In the following description and claims the term acceleration is used. Acceleration can be positive, i.e. speed increasing or negative, i.e. speed reducing, in relation to a direction of motion. Hence the term acceleration is used in the following to denote also situations where the vehicle is decelerating, in which case the acceleration is negative. Further, the acceleration may be of various magnitudes, a higher magnitude resulting in harder acceleration, be it positive (speed increasing) or negative (decelerating).

Embodiments of the invention will be exemplified in the following in relation to a hybrid vehicle, but are also equally applicable to other vehicles, e.g. electric vehicles, and conventional vehicles such as vehicles being powered only by means of combustion engines.

Figure 1A:
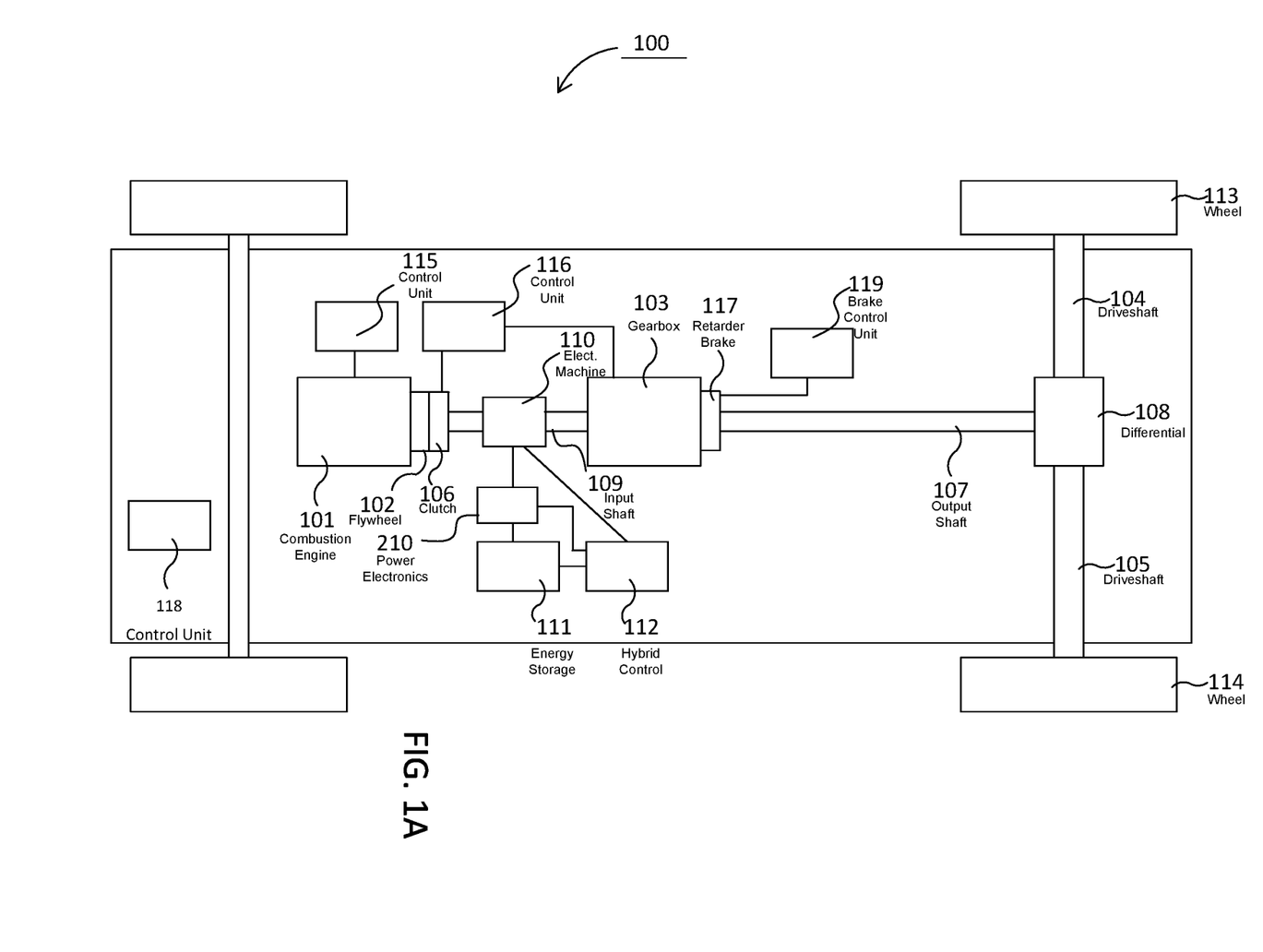
FIG. 1a illustrates a powertrain of a vehicle in which the present invention may be utilized.

FIG. 1A schematically illustrates a general layout of a powertrain in a hybrid vehicle 100 according to embodiments of the invention. There exist various types of hybrid vehicles and the vehicle of FIG. 1A is a parallel hybrid vehicle.

The powertrain of the parallel hybrid vehicle of FIG. 1A comprises a combustion engine 101, which in a conventional manner is connected, via an output shaft of the engine 101, usually via a flywheel 102, to a gearbox 103 via a clutch 106. The engine 101 is controlled by a vehicle control system via a control unit 115. Further, the gearbox 103 and the clutch 106, which in the present example is operated automatically by the vehicle control system but alternatively can be operated manually by the vehicle driver, are controlled by means of a control unit 116.

The vehicle further comprises driveshafts 104, 105 which are connected to tractive wheels 113, 114 and which, as in a conventional combustion engine system, are driven by an output shaft 107 of the gearbox via a final gear, e.g. a conventional differential 108.

In addition, the vehicle 101 comprises an electrical machine 110, which is connected to the input shaft 109 of the gearbox 103, downstream of the clutch 106, which means that the gearbox input shaft 109 can be driven by the electrical machine 110 also when the clutch 106 is open. Consequently, the parallel hybrid vehicle 101 can provide force to the tractive wheels 113, 114 from two separate power sources simultaneously, i.e. both from the combustion engine 101 and from the electrical machine 110. Alternatively, the vehicle 101 may be propelled by only one power source at a time, i.e. either by the combustion engine 101 or by the electrical machine 110. The present invention is still equally applicable to other types of hybrid vehicles. The vehicle may also be provided with two or more electrical machines, in which case an electrical machine may be fitted adjacent to each tractive wheel. The vehicle may further be of a type comprising a conventional automatic gearbox and an electrical machine upstream or downstream the gearbox.

The hybrid system also comprises further components. FIG. 1A depicts only the electrical machine 110, an energy storage 111 and a hybrid control unit 112 which controls, inter alia, the functions of the electrical machine 110 and of the energy storage 111. The electrical machine 110 is provided with a variable frequency power supply, enabling rotation at any desired rotation speed and any desired torque within the speed/torque range of the electrical machine 110. In the illustrated example, the electrical machine 110 is powered from the energy storage 111 via a power electronics unit 210 which generates said power supply frequency. The energy storage 111 may be arranged to be charged by regenerative braking by means of the electrical machine 110 and the power electronics unit 210, but also in other ways such as by connection to an external power source, e.g. a conventional electrical network.

The electrical machine 110 may thus be used to propel the vehicle 100 at, in principle, any desired speed by means of frequency control, and to apply, in principle, any desired brake force up to the brake force corresponding to the maximum torque that the electrical machine can deliver.

According to embodiments of the invention, a measure of brake system usage resulting from the driver actively requesting a brake force by operating brake system control means, such as a pedal or lever, is determined in order to assess the driver's way of operating the vehicle at least in certain types of situations.

With regard to active request for brake force from vehicle brake systems, the vehicle 100 may comprise various brake systems such as a conventional service brake system and a retarder brake system 117. Retarder brake systems may, for example, be situated on the output shaft of the gearbox 103, i.e. at the rear end of the gearbox, in which case brake action may, for example, be provided by electrical, hydraulic or magnetic braking of the gearbox output shaft and hence also of the vehicle's tractive wheels 113, 114. The vehicle may also have other supplementary brake systems by means of which a requested brake force can be applied. Such systems may include an exhaust brake system, a controllable engine brake system, a compression brake system, an electromagnetic brake system etc. As has been mentioned above, regenerative braking may also be provided for. Activation of these brake systems may be controlled by the control system when providing the brake force requested by the driver. Consequently, various brake systems may be activated when the driver actively requesting a brake force, and without the driver actually having knowledge of precisely which brake system or systems being activated. The present invention is carried out when a brake force is actively requested by the driver where the vehicle control system may utilize more than one brake system to apply the requested brake force, where the brake force may or may not be applied by the particular brake system usage being requested by the driver.

In the illustrated example, the service brake system and the retarder brake system 117 are operated by means of a brake control unit 119 which, for example, sends signals in a conventional manner to one or more regulators that regulate brake systems to apply the requested brake force. In the illustrated example, the brake control unit 119 also controls at least partly regenerative braking by the electrical machine 110. On the basis of commands initiated by the vehicle driver or other control units, the control unit 119 sends control signals to suitable system modules to demand desired brake force. For example, the driver may demand a retarder brake force or a service brake force, but if the control system finds that the desired brake force can be provided in a more economical manner e.g. by regenerative braking, regenerative braking may instead be employed.

The functions of the vehicle components are controlled by a number of control units. Control systems in vehicles oftentimes comprise a communication bus system consisting of one or more communication buses for connecting a number of electronic control units (ECUs), or controllers, to various components on board the vehicle. Such a control system may comprise a large number of control units, and taking care of a specific function may be divided between two or more of them.

For the sake of simplicity, FIG. 1A depicts only control units 112, 115, 116, 118 and 119 but in reality vehicles 100 of the type depicted are often provided with significantly more control units.

In addition to the control units referred to above, FIG. 1A also depicts a control unit 118 which controls the presentation of data on the instruments provided in the driving cab, which often comprise not only conventional dashboard instruments but also one or more displays. The control unit 118 makes it possible for a measure, to be presented on these one or more displays, or on a display intended specifically for the purpose, for viewing by the driver. The measure may e.g. be represented by numerical or graphical representation, or by a message, such as an audible or visible message, e.g. a text message, to the driver.

The invention may be implemented in any suitable control unit, and is in the illustrated example implemented in control unit 118. The calculations performed by control unit 118 (or the one or more control units in which the present invention is implemented) in estimating the driver's ability to utilize the energy stored in the vehicle by determining a measure of brake system usage according to the present invention will probably depend on signals received from the one or more control units which operate engine/motor functions, in the present example control unit 115, and probably also on signals from control units 112, 119 and other control units being present in the vehicle but not disclosed herein, and/or on information from for example various sensors on board the vehicle. It is generally the case that the control units are adapted to receiving sensor signals from various parts of the vehicle.

The control units are also usually adapted to delivering control signals to various parts and components of the vehicle. Control unit 118 may for example deliver signals to displays for presentation of data.

The operation is often governed by programmed instructions, typically in the form of a computer program which, when executed in a computer or control unit, causes the computer/control unit to effect desired forms of control action, e.g. method steps according to the present invention. The computer program usually forms part of a computer program product comprising a suitable storage medium 121 (see FIG. 1B) which has the computer program stored on it. The computer program can be stored in a non-volatile manner on said storage medium. Said storage medium 121 may for example take the form of any from among ROM (read-only memory), PROM (programmable read-only memory), EPROM (erasable PROM), flash memory, EEPROM (electrically erasable PROM), a hard disc unit etc., and be situated in, or in communication with, the control unit, in which case the computer program is executed by the control unit. The vehicle's behavior in a specific situation may thus be varied by altering the computer program's instructions.

Figure 1B:
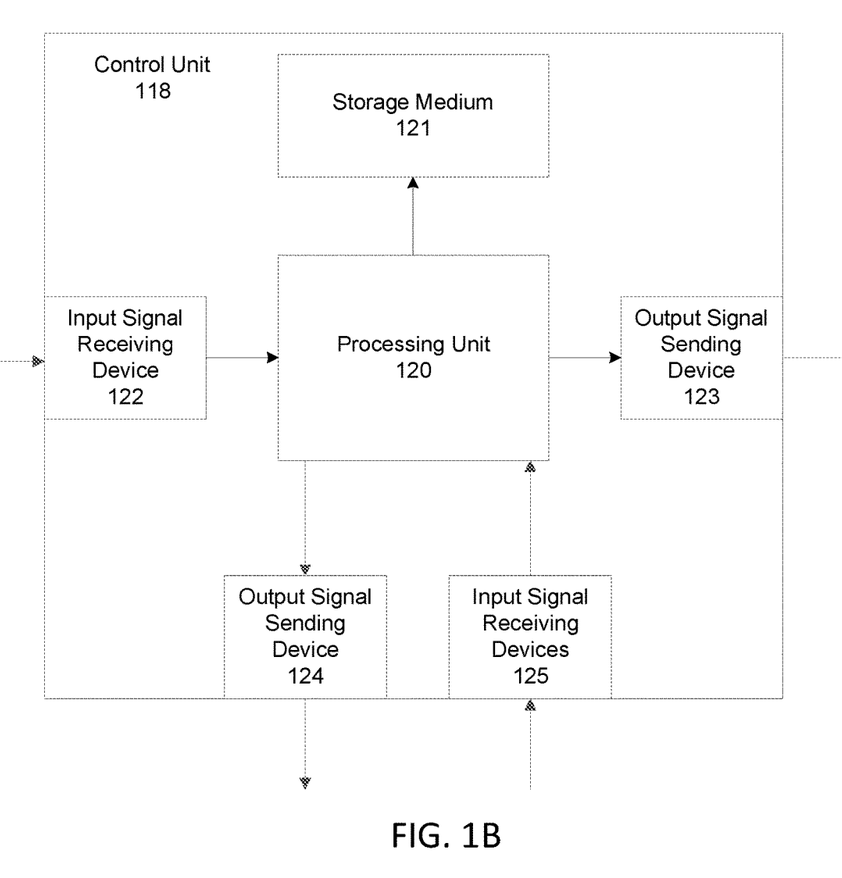
FIG. 1b illustrates an example of a control unit in a vehicle control system.

An example of a control unit (control unit 118) is schematically illustrated in FIG. 1B and may comprise a processing unit 120 in the form of, for example, any suitable kind of processor or microcomputer, e.g. a circuit for digital signal processing (Digital Signal Processor, DSP), or a circuit with a predetermined specific function (Application Specific Integrated Circuit, ASIC). The processing unit 120 is connected to a memory unit 121 which provides it with, for example, the stored program code and/or the stored data which the processing unit needs to enable it to perform calculations. The processing unit 120 is also arranged to store partial or final results of calculations in the memory unit 121.

Control unit 118 is further provided with respective devices 122, 123, 124, 125 for receiving and sending input and output signals. These signals may comprise waveforms, pulses or other attributes which the input signal receiving devices 122, 125 can detect as information for processing by the processing unit 120. The output signal sending devices 123, 124 are arranged to convert calculation results from the processing unit 120 to output signals for conveying to other parts of the vehicle's control system and/or the component or components for which the signals are intended. Each of the connections to the respective devices for receiving and sending input and output signals may take the form of one or more from among a cable, a data bus, e.g. a CAN (Controller Area Network) bus, a MOST (Media Oriented Systems Transport) bus or some other bus configuration, or a wireless connection.

Figure 2:
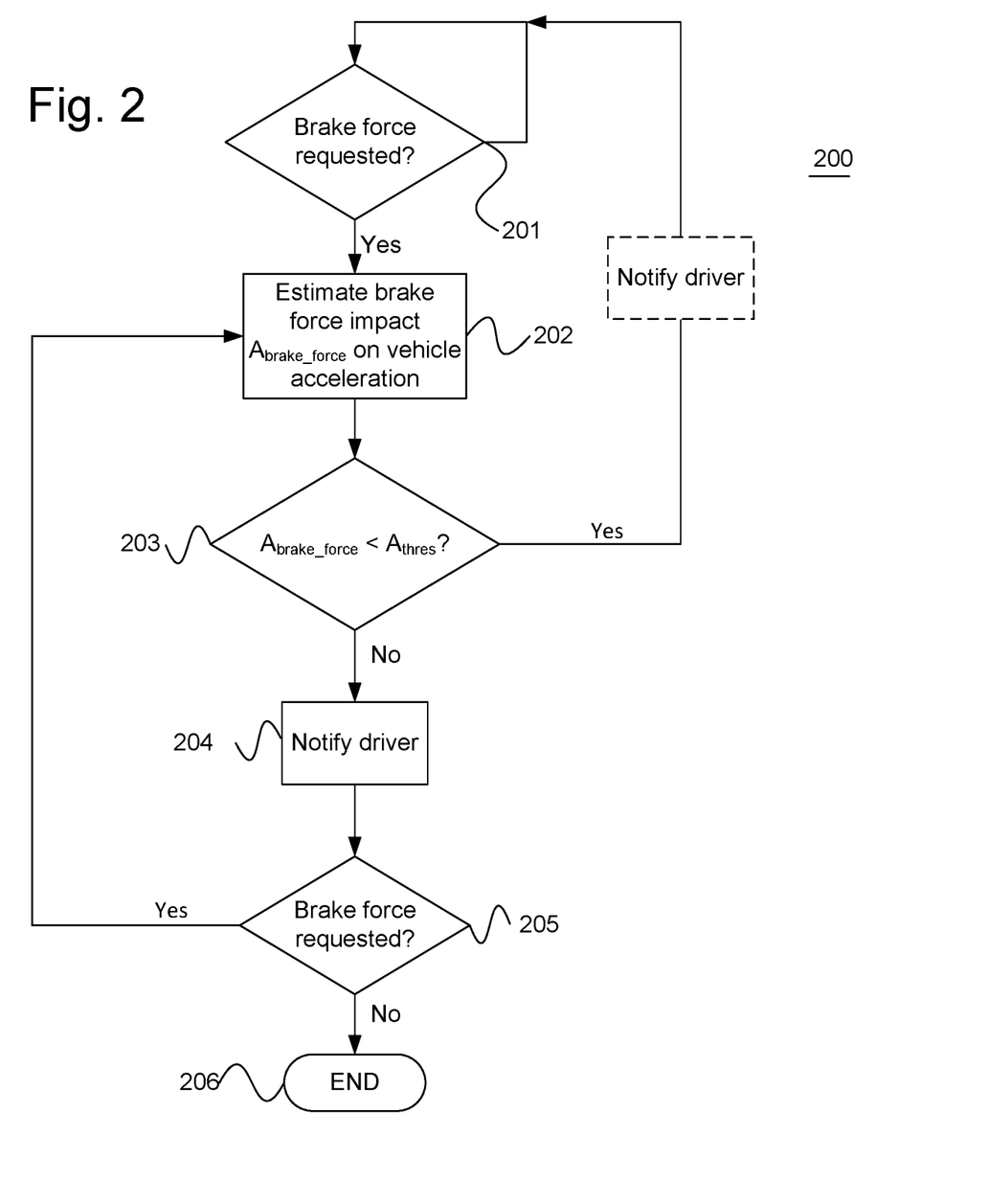
FIG. 2 illustrates an example of a method according to embodiments of the invention.

FIG. 2 illustrates an example of a method 200 according to the present invention. The method begins at step 201 by determining whether a brake force is requested by the vehicle driver, i.e. it is determined whether brake force is actively demanded by the driver actively having activated a brake system. This may, for example, be determined by the vehicle driver operating a brake pedal, a retarder control lever or by actively requesting a brake force in any other suitable way by means of the service brake system, the retarder brake system or any other vehicle brake system that can be activated by the driver.

The brake force resulting from combustion engine losses and other powertrain losses is passive, and present without the driver actively demanding a brake force. Hence such braking effect does not represent an active request for brake force from a brake system according to the invention.

As was mentioned above, an object of embodiments of the invention is to determine the manner in which the vehicle is operated from a brake system usage perspective, i.e. determining the manner in which stored energy in the vehicle in practice is utilized by the driver. According to the invention this is accomplished by determining a measure of use of vehicle brakes when actively applying a brake force.

Consequently, when it is determined in step 201 that the driver actively requests a brake force, the method continues to step 202. In step 202, the impact of the applied brake force on the current vehicle acceleration is estimated. This can be estimated in any suitable manner. For example, the resulting (actual) vehicle acceleration with the applied brake force can be determined and compared to an estimated vehicle acceleration that would have prevailed had the brake force not been applied.

When the vehicle is in motion, no brake systems are actively activated and no propelling force for propulsion of the vehicle is requested, the acceleration of the vehicle is primarily affected by brake forces caused by the force of gravity, air resistance, rolling resistance and powertrain losses. These factors are discussed below.

The impact of the air resistance, drag, on vehicle acceleration can e.g. be determined as the air resistance force $F=\frac{1}{2}\rho A C_d v^2$, in which $\rho$=density of air, A=cross-sectional area of vehicle in direction of travel, v=vehicle speed relative to wind. The air resistance is highly (quadratic) dependent on vehicle speed. Cd=air resistance coefficient, which depends on the configuration of the vehicle's surfaces which face the wind and is in principle affected by all of its external parts. The air resistance coefficient may be difficult to calculate but the air resistance force can be estimated by the vehicle control system by subtracting other counteracting forces from the propelling force developed by the engine/motor, which may be available via the engine control unit, and which may be zero when no propulsion force is requested. The air resistance coefficient may thus also be estimated. Alternatively, Cd may be measured beforehand and e.g. for various vehicle combinations, such as for possible trailer combinations.

The impact (deceleration) on the vehicle resulting from air resistance may then be calculated e.g. from the general formula $F=m_v a$, $m_v$ being the vehicle weight, and where the impact will be decelerating. The vehicle weight $m_v$ can be estimated in various ways, as is known to the person skilled in the art.

The rolling resistance may be expressed as $F=C_r N$, in which Cr is the rolling resistance coefficient, which depends mainly on the vehicle's tyres/wheels, the road surface and the normal force N, which can be determined as $N=m_v g \cos\alpha$, where:

g represents the constant of gravity (approx. 9.82 m/s^2),
α represents the present inclination of the surface on which the vehicle is travelling (radians), and as above,
$m_v$ represents the vehicle weight.

The impact on the vehicle acceleration from the rolling resistance force can also be determined according to the general formula $F=m_v a$, where the impact will be decelerating.

With regard to powertrain losses, these arise from various sources, but in general primarily from combustion engine friction. The impact on acceleration from internal friction, engine losses, of the combustion engine may be calculated from the friction torque $T_{frict}$, which is specific to the engine. The resulting brake force, taking gear ratios from engine to drive wheel into account, can be calculated from $$F = \frac{\omega T_{frict}}{v},$$

ω being the angular velocity (2π*engine rotation speed) and v being the vehicle speed. The corresponding influence on vehicle acceleration from engine losses can be determined as above, where the impact also will be decelerating.

As can be seen from the equation, the engine friction losses depend on rotation speed and increases with increasing rotation speed. If the vehicle is operated with the combustion engine disconnected from the tractive wheels, this term may be deleted. If a still more accurate estimation of vehicle acceleration without applied brake force is desired, the calculation may include further factors such as gearbox friction, losses due to the efficiency of the gearbox and friction losses in axles/hubs, can be taken into account, which again may depend on rotation speed. Efficiency is also involved here. The composite losses of the powertrain, or individual losses of its various components, may be stored for different rotation speeds in the control system and be used in making estimates according to the invention.

The vehicle will also be influenced by a gravitational force component parallel to the surface on which the vehicle is travelling. This force can be calculated as:

$$F_{Grav} = m_v g \sin\alpha$$

where $m_v$, g and α are defined as above.

The impact on acceleration can be determined as above, but depending on whether the vehicle is going uphill or downhill the impact on the acceleration will be negative (decelerating) or positive (speed increasing).

Consequently, the estimated vehicle acceleration $A_0$ that would prevail had the driver not applied a brake force can be estimated by summing up the contributions to the acceleration from the factors above. This estimated acceleration $A_0$ is then compared with the actually prevailing acceleration, which can be determined in a straight-forward manner, e.g. by simply determining the actual acceleration $A_{vehicle}$ that the vehicle undergoes. The difference in acceleration $A_{brake\,force}$, i.e. the impact on vehicle acceleration by means of the driver applied brake force, is determined by the difference between these two measures, $$A_{brake\,force} = A_{vehicle} - A_0.$$

As an alternative, the impact on acceleration of the driver applied brake force $A_{brake\,force}$ can be estimated instead of measured in a manner similar to the above by estimating the resulting brake force on the vehicle wheels and the resulting acceleration in a manner similar to the above. Such estimation is known to the person skilled in the art.

When the impact on vehicle acceleration from the driver applied brake force has been determined in step 202, the method continues to step 203. In step 203 the determined influence on vehicle acceleration is compared to an acceleration difference threshold $A_{thres}$.

If the influence on vehicle acceleration $A_{brake\,force}$ from the driver applied brake force is below the threshold $A_{thres}$ the method returns to step 201. In this case it is determined that the influence on the acceleration from the braking action is within a level where it is considered that the driver is still driving the vehicle in a sufficiently economical manner. This can be arranged to be communicated to the driver using any kind of suitable indication, e.g. such as a text message via a display or an "eco indicator" indicating economical driving. For example, an indicator indicating various levels of economical driving can be used where the particular indication can be arranged to depend on the magnitude of $A_{brake\,force}$. This is indicated by a notification box in dashed lines in FIG. 3.

The indication can be a measure for the whole of the period in which a brake force is applied, and change as the applied brake force changes. A measure being determined and accumulated over a number of successive periods of brake usage can also be arranged to be displayed. According to one embodiment no indication to the driver is made. Instead, the method returns to step 201 for a new determination of the applied brake force. The method of FIG. 2 can be arranged to be carried out continuously.

If it is determined in step 203 that the magnitude of the influence $A_{brake\,force}$ on the vehicle acceleration by the applied brake force exceeds the acceleration threshold $A_{thres}$, the method continues to step 204 where the driver is notified. Again, this can be arranged to be carried out in various ways, e.g. by means of an eco indicator indicating level of economical driving according to the above. According to one embodiment the notification, instead, consists of use of one or more messages being displayed to the driver. For example, such messages may include recommendations to commence braking earlier to thereby enable use of less brake force, or simply a recommendation to try to apply less brake force. The message can be repeated or remain on display for as long as the acceleration threshold $A_{thres}$ is exceeded.

It is, for example, possible for data to be presented on a display with a measure of brake system usage which represents both an assessment of the latest period when a brake force is requested and a total assessment of the vehicle journey. The data may, for example, be presented only when a brake force is applied or continuously. The data may also be accessible via e.g. a vehicle infotainment system.

Figure 3:
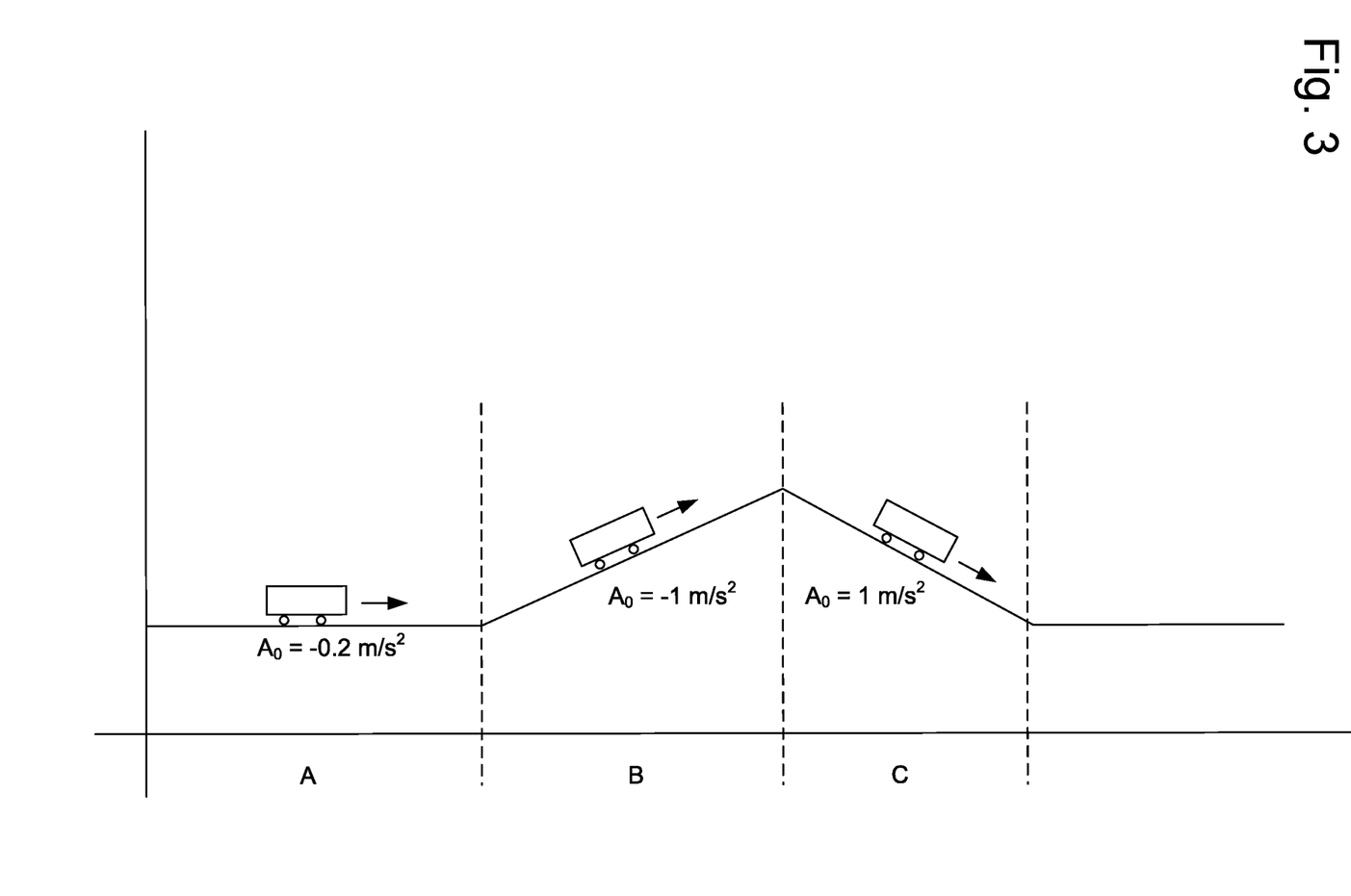
FIG. 3 illustrates vehicle acceleration for different driving situations.

The acceleration threshold $A_{thres}$ can be arranged to be set to some suitable value, such as e.g. a negative (decelerating) acceleration in the interval 0 m/s² to 2 m/s², or in the interval 0.5-1.5 m/s². According to one example, the acceleration threshold $A_{thres}$ is set to (−) 0.8 m/s². As is explained above, this is not the same as the actual acceleration that the vehicle undergoes, but the impact on the acceleration from the driver applied brake force. The actual vehicle acceleration will in general differ from $A_{brake\,force}$. This is illustrated in FIG. 3, where vehicle acceleration is exemplified for three different situations A, B and C.

In situation A the vehicle 100 is travelling on level ground and the vehicle acceleration $A_0$ that would prevail had the driver not applied a brake force is exemplified as −0.2 m/s². This means that in situation A, a vehicle acceleration of up to −0.2 m/s²+(−0.8 m/s²)=−1 m/s2 is considered to fulfil the criteria for driving the vehicle in an economical manner.

In situation B, the vehicle 100 is travelling uphill and the vehicle acceleration $A_0$ that would prevail had the driver not applied a brake force is exemplified as −1 m/s². This means that in situation B a vehicle acceleration of up to −1 m/s²+(−0.8 m/s²)=−1.8 m/s² is considered to fulfil the criteria for driving the vehicle in an economical manner.

In situation C the vehicle is going downhill and the vehicle acceleration $A_0$ that would prevail had the driver not applied a brake force is exemplified as +1 m/s². This means that in situation C a vehicle acceleration of up to 1 m/s²+(−0.8 m/s²)=0.2 m/s2 is considered to fulfil the criteria for driving the vehicle in an economical manner.

According to the above example, the acceleration threshold $A_{thres}$ is maintained at a same level irrespective of the driving conditions. According to embodiments of the invention, however, the acceleration threshold $A_{thres}$ is arranged to differ for different driving situations. For example, different thresholds can be used in dependence of whether the vehicle is travelling uphill, downhill and/or on level ground to account for the different impacts on vehicle acceleration from road inclination.

If the vehicle is travelling uphill, such as in situation B in FIG. 3, the acceleration threshold $A_{thres}$ can be set to a relatively low value, since in such situations the vehicle will begin to decelerate as soon as a propelling force is interrupted and, as in example B above, have a deceleration of −1 m/s² already before the driver applies a brake force. In situations of this kind, therefore, $A_{thres}$ can be reduced when the vehicle is going uphill, and e.g. be dependent on the inclination and/or the acceleration that the inclination gives rise to.

Furthermore, if the vehicle is travelling downhill, such as in situation C in FIG. 3, the acceleration threshold $A_{thres}$ can be set to a relatively high value, since in such situations the vehicle will accelerate unless a brake force is applied. Also, according to the example in situation C, the vehicle will still be accelerating even if a brake force amounting to the threshold $A_{thres}$ is applied. Hence, in situations of this kind $A_{thres}$ can be increased to allow the vehicle to decelerate without the driver being considered to use vehicle brakes in a undesired manner. $A_{thres}$ may e.g. be dependent on the inclination and/or the acceleration that the inclination gives rise to, and e.g. be set to a value that allows some suitable deceleration of the vehicle.

According to one embodiment the threshold $A_{thres}$ is set to some value, e.g. as above, which is always considered to be acceptable, but where $A_{thres}$ is increased when going downhill, e.g. to allow a deceleration of the vehicle to be some suitable deceleration, e.g. in the interval 0.5-1.5 m/s².

According to one embodiment, instead, the determination is performed in relation to the resulting vehicle acceleration, so that a particular maximum vehicle acceleration is accepted, e.g. a vehicle acceleration $A_{vehicle}$ in the interval 0 m/s² to 2 m/s², or in the interval 0.5-1.5 m/s², such as e.g. 0.8 m/s².

In this way, the same vehicle deceleration will always be accepted irrespective of whether the vehicle is going uphill or downhill, but where the acceptable brake force will be considerably lower when the vehicle is going uphill than when going downhill.

When a message has been displayed in step 204 it is determined if a brake force is still requested by the driver in step 205, and for as long as this is the case the method returns to step 202 for new determination of the impact of the brake force on vehicle acceleration. Otherwise the method is ended in step 206, or returned to step 201.

It should also be noted that the calculations exemplified above are merely examples of how the vehicle acceleration can be determined, and any suitable methods can be used. It is within the scope of the present invention to perform the calculations in an appropriate way with regard to the vehicle in which the claimed method is utilized.

The method illustrated in FIG. 2 may be arranged to be applied only for as long as the vehicle's cruise control functions are inactivated, since if a cruise control function is activated the vehicle's control system will largely take control of vehicle operation including the application of brake force. Irrespective of whether a cruise control function is activated or not, however, the present invention is applicable as soon as the driver actively activates a vehicle brake system for applying a brake force.

The above exemplary embodiments relates to situations where brake system usage is evaluated. The claimed method can also be combined with a method for determining a measure of energy utilization during operation of the vehicle when demand for motive force is interrupted and no brake force is actively applied. In this case energy consumption during operation of the vehicle without demanding brake force is estimated, and the estimated energy consumption is used as a basis for determining a measure of energy utilization during operation of said vehicle.

That is, according to this embodiment, evaluations can be performed both when a brake force and when a brake force is not applied so that further situations in total can be evaluated. Examples of evaluating energy utilization when a brake force is not applied is disclosed in the international application WO 2014126529 (A1), which is incorporated herein by reference.

Furthermore, the measure of brake system usage and/or energy utilization may also be arranged to be transmitted to a remote location, e.g. a fleet management system/centre, making it possible for two or more vehicles/drivers to be evaluated centrally.

As was mentioned, the method may further comprise determining said measure for one brake action at a time, enabling the driver to receive an assessment for a specific situation in which brakes are applied and hence to obtain and be presented with a new assessment for each interruption. The measure of brake system usage may also be determined continuously when a brake force is applied, in which case the measure/assessment may change instantaneously depending on the applied brake force.

The measure of brake system usage may also take the form of a cumulative measure covering a number of successive activations of a brake system, e.g. an accumulated measure of brake system usage from when the vehicle is taken into operation by the driver for the first time, or a measure representing the current journey or some other suitable period of time, e.g. the current month. All such data may be transmitted e.g. to a fleet management system.

The invention is described above in relation to a parallel hybrid system, but is also applicable on vehicles with other types of hybrid systems, as also on for example electric vehicles which have one or more electrical machines only. The invention is also applicable on conventional vehicles with combustion engine operation only.

The invention claimed is:

1. A method for determining a measure of brake system usage during operation of a vehicle, the vehicle comprising a power source for generating a motive force for propulsion of said vehicle in a first direction of travel, and driver controllable means for requesting a brake force that acts against a movement of said vehicle in said first direction of travel, wherein when a driver of said vehicle requests a brake force by means of said driver controllable means said method comprises:

determining an influence on the vehicle acceleration caused by said request for brake force by the driver, wherein said influence is determined based on a difference in acceleration that said request for brake force causes in said vehicle in relation to a vehicle acceleration had there been no request for brake force by the driver; and determining, based on said determined influence on the vehicle acceleration, a measure of brake system usage of said vehicle, said measure being arranged to indicate a level of economical driving, wherein the level is arranged to depend on a magnitude of the influence on the vehicle acceleration caused by said request for brake force.

2. The method according to claim 1, further comprising:
comparing a magnitude of a difference in acceleration that said request for brake force causes with an acceleration threshold; and
determining that driving is more economical when said magnitude of the difference in acceleration is below said acceleration threshold than when said magnitude of the difference in acceleration exceeds said acceleration threshold.

3. The method according to claim 2, wherein said acceleration threshold is arranged to differ in dependence of an inclination on a surface on which said vehicle is travelling.

4. The method according to claim 3, wherein said acceleration threshold is higher when said vehicle is going downhill than when going uphill.

5. The method according to claim 4, wherein, when going downhill, said acceleration threshold is compared to a difference in acceleration that said request for brake force causes and a first selected acceleration.

6. The method according to claim 2, wherein said acceleration threshold is a vehicle decelerating acceleration, in the interval −0.5 to −1.5 m/s$^2$.

7. The method according to claim 2, wherein said acceleration threshold is a vehicle decelerating acceleration of −0.8 m/s$^2$.

8. The method according to claim 1, further comprising presenting said measure of brake system usage to the driver of said vehicle.

9. The method according to claim 1, further comprising:
determining a measure of energy utilization during operation of the vehicle in a first period of time when a demand for motive force from said first power source is interrupted and when no brake force is requested by the driver:
estimating energy consumption during operation of said vehicle; and
using said estimated energy consumption during operation of said vehicle as a basis for determining a measure of energy utilization during operation of said vehicle.

10. A computer program product comprising computer program code stored on a non-transitory computer-readable medium, said computer program product for determining a measure of brake system usage during operation of a vehicle, the vehicle comprising a power source for generating a motive force for propulsion of said vehicle in a first direction of travel, and driver controllable means for requesting a brake force that acts against a movement of said vehicle in said first direction of travel, wherein when a driver of said vehicle requests a brake force by means of said driver controllable means, said computer program product comprising computer instructions to cause said at least on control unit to perform the following operations:
determining an influence on a vehicle acceleration caused by said request for brake force by the driver, wherein said influence is determined based on a difference in acceleration that said request for brake force causes in said vehicle in relation to a vehicle acceleration had there been no request for brake force by the driver; and
determining, based on said determined influence on the vehicle acceleration, a measure of brake system usage of said vehicle, said measure being arranged to indicate a level of economical driving, wherein the level is arranged to depend on a magnitude of the influence on the vehicle acceleration caused by said request for brake force.

11. A system for determining a measure of brake system usage during operation of a vehicle, the vehicle comprising a power source for generating a motive force for propulsion of said vehicle in a first direction of travel, and driver controllable means for requesting a brake force that acts against a movement of said vehicle in said first direction of travel, wherein when a driver of said vehicle requests a brake force by means of said driver controllable means, said system comprises:
means configured to determine an influence on a vehicle acceleration caused by said request for brake force by the driver, wherein said influence is determined based on a difference in acceleration that said request for brake force causes in said vehicle in relation to a vehicle acceleration had there been no request for brake force by the driver; and
means configured to, using said determined influence on the vehicle acceleration, determine a measure of brake system usage of said vehicle, said measure being arranged to indicate a level of economical driving, wherein a particular level is arranged to depend on a magnitude of the influence on the vehicle acceleration caused by said request for brake force.

12. A vehicle comprising a system for determining a measure of brake system usage during operation of a vehicle, the vehicle comprising a power source for generating a motive force for propulsion of said vehicle in a first direction of travel, and driver controllable means for requesting a brake force that acts against a movement of said vehicle in said first direction of travel, wherein when a driver of said vehicle requests a brake force by means of said driver controllable means, said system comprises:
means configured to determine an influence on a vehicle acceleration caused by said request for brake force by the driver, wherein said influence is determined based on a difference in acceleration that said request for brake force causes in said vehicle in relation to a vehicle acceleration had there been no request for brake force by the driver; and
means configured to, using said determined influence on the vehicle acceleration, determine a measure of brake system usage of said vehicle, said measure being arranged to indicate a level of economical driving, wherein a particular level is arranged to depend on a magnitude of the influence on the vehicle acceleration caused by said request for brake force.

* * * * *